Patented May 8, 1934

UNITED STATES PATENT OFFICE 1,958,210

METHOD OF MAKING ARYL PHOSPHATES AND PRODUCT THEREOF

Winfield Scott, Nitro, W. Va., assignor to Kavalco Products, Inc., Nitro, W. Va., a corporation of West Virginia No Drawing. Application July 1, 1932, Serial No. 620,550

14 Claims. (Cl. 260—99.20)

This invention relates to a process for making aryl phosphates.

One object of this invention is the provision of a method whereby higher yields of pure products may be produced than has been possible heretofore.

Other objects will be in part obvious and in part pointed out hereinafter.

The manufacture of tricresyl phosphate will first be described. One of the materials used is cresylic acid, which may be the commercial product, and which contains in addition to the three isomeric cresols, such bodies as phenol and some of the xylenols, or it may be a pure cresol or mixture of cresols. Special cuts of commercial cresylic acid may be used to prepare products with slightly different properties. The other product used in the preparation of tricresyl phosphate is phosphorus oxychloride, although other methods of preparation have been described from time to time. The proportions of the charge employed are as follows:

1000 parts by weight of cresylic acid.
470 parts by weight of phosphorus oxychloride.

Any desired charge using these proportions may be placed in a suitable reaction pot or kettle, to bring about the reaction between cresylic acid and phosphorus oxychloride. The reaction pot or kettle may be made of any suitable materials, as for example, glass enamel lined, silver lined, lead or lead lined. Such a reaction kettle is provided with a reflux condenser and scrubber, since some of the phosphorus oxychloride is volatilized with the effluent hydrochloric acid gas and would otherwise escape. The scrubber may contain any suitable solvent for phosphorus exychloride, but cresylic acid is preferred as this can be used in the following batch and fresh cresylic acid then supplied to the scrubber.

When the charge has been introduced into the condensation kettle, heat is applied. Until a temperature approximating the boiling point of phosphorus oxychloride is reached, the rate of heating can be fairly rapid. After a temperature of approximately 90° C. is reached, heating is continued at such a rate that the temperature rise is 5 to 10° C. per hour, until a temperature of about 230° is reached, at which point it is maintained until the reaction is finished. This gives higher yields and presents less difficulties in purification, in that it is not necessary to remove undue amounts of intermediate products. The end of the reaction is determined by removing a small sample and subjecting it to a vacuum distillation in the laboratory. Since a small amount of phosphorus oxychloride is lost during the condensation, there will be a little cresylic acid found in the completely reacted product. During this test distillation, there should be very little or no distillate coming over between the cresylic acid and tricresyl phosphate, indicating the absence of intermediate chlorides. The time of heating at 230° may vary from about 12 to 24 hours or even longer, before the reaction is completed. At the end of the reaction, heating is discontinued and the entire reaction mass is allowed to cool to about 150° C.

The contents of the condensation kettle are then blown to an intermediate storage tank for this crude product. The crude tricresyl phosphate contains some hydrochloric acid at this stage and to neutralize and remove substantially all this acid, powdered hydrated lime is added to the extent of about one part for each 150 to 200 parts of crude tricresyl phosphate. This largely overcomes corrosion in the vacuum still, lines, receivers, etc.

The crude tricresyl phosphate is then distilled under vacuum at a pressure preferably below 25 millimeters. It is necessary to carry out the distillation at a relatively low pressure to obviate the formation of tarry decomposition products and colored distillates. The still may be made of any suitable material, as for example, duriron, glass enamel lined or iron. The still is equipped with a short, lagged column, and is packed to avoid entrainment of liquid with the distilling vapors, and to effect fractionation. Two distillate receivers are used, one being for heads and any discolored material coming over at the end of the distillation, and the other for receiving the distilled tricresyl phosphate.

A charge of the crude tricresyl phosphate is placed in the still and evacuated to a pressure of about 18 to 20 millimeters. This low pressure may be varied beyond the limits just given as these limits are illustrative of one embodiment of the invention. After this vacuum is checked, and pumps, etc. found to be working properly, heat is applied to the still. The temperature gradually rises and during this time any excess cresylic acid and unconverted chlorides are distilled off. When the liquid in the still reaches a temperature of about 310° C., the time-temperature curve becomes flat and tricresyl phosphate distills over. At this time the distillate is switched from the heads or crude receiver to the tricresyl phosphate receiver. A distilling range of about 20° C. is used, but most of the tricresyl phosphate is obtained in a 10° C. range.

The end of the distillation is noted by a rather sudden rise in the still temperature. When this occurs the heating is immediately discontinued and the distillate switched from the tricresyl phosphate receiver to the heads receiver in order that superheated and colored material may not contaminate the tricresyl phosphate.

At the end of the distillation the still is cooled and the tarry residue removed. The main head is removed and the still thoroughly cleaned to remove all traces of carbonaceous matter and to leave an absolutely clean still for the next run.

The next step in purification is the removal of certain bases as pyridine and its homologues or their salts that have been carried through and which originally existed as impurities in the cresylic acid. Such impurities are present in extremely small amounts but must be removed in order that tricresyl phosphate of the highest purity may be produced. The distilled product above is pumped to a tank or suitable container where it is thoroughly mixed with about 2% of its weight of 66° Bé. sulfuric acid and allowed to stand for a period of a few hours. After this acid digestion the product is drawn off into a washer equipped with an efficient agitator. The washer contains a quantity of hot water substantially equal to that of the distilled tricresyl phosphate. In these water and caustic washes the temperature should not fall below 60° C. as emulsification results at lower temperatures and separation of the product then is practically impossible. The mixture is vigorously stirred for a period of about 15 minutes and then run to a settling tank and permitted to settle. While the wash is settling, a volume of 4% caustic soda solution equal approximately in volume to that of the tricresyl phosphate product is placed in the washer and heated to about 70° C. The lower layer of tricresyl phosphate is then run into the washer and the wash water may be discarded. The caustic solution and tricresyl phosphate are agitated vigorously for about 10 to 15 minutes and then transferred to the settling tank. While the caustic wash is settling an equal volume of hot water (about 80–90° C.) is run into the washer and the caustic washed tricresyl phosphate run in and agitated for several minutes.

Up to this point the distilled tricresyl phosphate has received an acid treatment, a water wash, a caustic soda wash and a water wash. The product is given another caustic wash with 2% caustic soda solution, and two more water washes in the manner described. If necessary, another water wash may be employed to remove all traces of caustic soluble impurities. The final water wash should not react alkaline to phenolphthalein.

After the series of washings have been completed the tricresyl phosphate is separated and transferred to a decolorizing and drying kettle where it is dried at 100 to 110° C. When the water has been mostly removed, from 1% to 4% of the weight of the tricresyl phosphate of decolorizing carbon is added. The heating is then continued until the tricresyl phosphate product is dry. It is necessary that the material be agitated during the drying and decolorizing process in order to obtain the most intimate contact between the phosphate and the decolorizing carbon. After the product is thoroughly dry it is filtered and is obtained as a substantially water white liquid free from phenolic bodies and pyridine bases, and which is neutral. The decolorizing treatment as the final step is one of the most important in the process. Even with the most careful caustic washing it is not possible to produce a material that is entirely free from oxidizable impurities. The decolorizing carbon then serves the double purpose, decolorizing to give a water white material together with the removal of certain oxidizable impurities.

The manufacture of triphenyl phosphate will now be described. The materials used in the preparation are phenol and phosphorus oxychloride. The phenol may be a commercial grade or the U. S. P. quality. To react phenol and phosphorus oxychloride they are used in the following proportions:

100 parts by weight of phenol
55 parts by weight of phosphorus oxychloride.

The desired charge is placed in a reaction vessel of the same type as used in the condensation of cresylic acid and phosphorus oxychloride to form tricresyl phosphate. The reaction is promoted by heating, which may be applied rather rapidly until a temperature of approximately 90° is reached. At this temperature heating is carried out more slowly and a temperature rise of about 5 to 10° per hour permitted. When a temperature of about 230° C. is reached it is maintained until the condensation is completed. The total reaction time is from 40 to 60 hours. By maintaining the above temperature for the time indicated, higher yields and purer products are obtained. The completion of the condensation is determined by a vacuum distillation of a small sample. If the reaction is finished the distillation of the sample does not show the presence of any of the intermediate chloride products.

It is well to point out that the reaction of phenol or other aryl hydroxy compounds and phosphorus oxychloride is a mono-molecular reaction and not a tetra-molecular reaction, i. e., three molecules of phenol and one molecule of phosphorus oxychloride do not unite simultaneously to form triphenyl phosphate and hydrochloric acid, but the reaction proceeds in distinct steps. The first product formed may be called dichlormonophenylphosphate, the second monochlordiphenylphosphate, and the third and final product triphenyl phosphate. This may be illustrated by the following equations using phenol as an example:

I. $C_6H_5OH + POCl_3 \rightarrow C_6H_5OPOCl_2 + HCl$

Dichlormonophenylphosphate

II. $C_6H_5OH + C_6H_5OPOCl_2 \rightarrow (C_6H_5O)_2POCl + HCl$

Monochlordiphenylphosphate

III. $C_6H_5OH + (C_6H_5O)_2POCl \rightarrow (C_6H_5O)_3PO + HCl$

Triphenylphosphate

These intermediate chloride products can be isolated from the reaction mixture by fractional distillation under vacuum if the reaction between phenol and phosphorus oxychloride is not run to completion. As the phenoxy groups become attached to phosphorus, the boiling point of the resulting products is raised so that as the first stage of the reaction is completed the loss of oxychloride with the evolved hydrochloric acid gas is decreased.

Of the three above illustrated reactions, the third is completed with the greatest difficulty and requires high temperature and time for completion. If diphenyl monochlorphosphate is present in excessive amounts, a portion of it may distill over with the triphenyl phosphate and will be decomposed and lost during subsequent processing. If it or its decomposition products are not completely removed, the final product will be of an inferior quality.

After the condensation is completed, the hot, crude triphenyl phosphate is transferred into a storage tank equipped with heating coils to prevent freezing of the product. Any portion of the material in storage may then be charged into the still for vacuum distillation. The still may be constructed of the same materials described in connection with the still used in the manufacture of tricresyl phosphate above described. The still is provided with a packed column for fractionation and for preventing entrainment of liquids with the distilling vapors. The still is equipped also with a condenser and two receivers, one receiver being for heads (phenol and any small amount of chlorides) and the other for receiving the triphenyl phosphate product. A thermometer extending down into the liquid in the still indicates the temperature of the distilling liquid. This indicates a higher temperature than is shown by the one in the column.

A charge of crude triphenyl phosphate is charged into the still and heat and vacuum are applied. Distillation under a rather low pressure (about 15 to 25 mm. at the still) is necessary to prevent superheating and the resultant loss from the formation of tarry residues and colored distillates. The temperature gradually rises and phenol and other lower boiling impurities distill over until a temperature of about 300 to 305° C. in the still liquid is reached. Triphenyl phosphate distills over at this temperature, which is maintained at this point until the distillation is finished. The time to change the distillate from the phenol receiver to the triphenyl phosphate receiver can be judged by observing the temperature and pressure, and when the time-temperature curve has begun to flatten. Also, samples of the distillate are removed from time to time and the congealing point determined, which should not be below about 42° C. when the distillate is changed over to the triphenyl phosphate receiver. The end of the distillation can be determined from the volume of distillate obtained and the fact that a rather sharp rise in temperature within the still is observed. When this occurs, or a colored distillate shows, the condensate is cut back to the heads receiver, and heating is discontinued.

The distilled triphenyl phosphate while still molten is transferred to a storage tank equipped with a heating system to prevent the material from solidifying. A charge of the distilled triphenyl phosphate is run into an equal volume of 2% to 3% caustic soda solution previously heated to about 70° C. in a washer and stirred vigorously for about 10 to 20 minutes. After this washing, the contents are run to a settling tank from which the triphenyl phosphate is drawn off from the bottom and sent back to the washer and the caustic wash water is discarded. The caustic washed material is then given a hot water wash at 80 to 90° C. and separated as before.

A second alkaline wash is necessary for proper purification. This may consist of a milder alkali such as a 3% soda ash solution or a weaker caustic soda solution (1–2%), so that all caustic soluble impurities may be removed. This wash is carried out in the same manner as the first caustic wash. After separating the triphenyl phosphate from the wash water it is washed with hot water until neutral to phenolphthalein. This usually requires two or three water washes. The material is, at this point, ready for crystallization and is substantially water white while molten although it may have a cloudy appearance due to a small amount of water suspended in it.

The crystallization step will now be described. To every pound of triphenyl phosphate product, is added about 1.5 pounds of substantially anhydrous methanol with stirring. When the solution is homogeneous, a quantity of decolorizing carbon equivalent to ¼ to 1% of the weight of the triphenyl phosphate is added and the solution is heated to boiling for a few minutes. Then the mixture is filtered into a crystallizer equipped with a stirrer and cooling jacket. The solution is then cooled to 30° C. and distilled water is run in slowly until the solution begins to show turbidity. The mixture is then cooled with slow stirring to 10–15° C. whereupon triphenyl phosphate crystallizes out. To obtain the crystalline material, one may also cool to 20–25° C. and add approximately an equal volume of water slowly, whereupon the triphenyl phosphate comes out of solution in crystalline form. The contents of the crystallizer are then centrifuged and washed with a small amount of methanol and then with distilled water. The crystals are then removed from the centrifuge, placed on trays and dried.

Instead of using anhydrous methanol as given above, 76 to 78% methanol may be used as this strength becomes turbid at approximately 30° C.

The process of producing phosphates as given above in connection with cresylic acid and phenol may also be used with the xylenols or other homologues or similar compositions.

The triaryl phosphates obtained from the foregoing processes are much purer than were products heretofore obtained in the art and the tricresyl phospate and triphenyl phosphate prepared according to the methods above set forth stand the permanganate test better than other commercial products on the market. In the permanganate test N/100 potassium permanganate solution is used. About 10 grams of the tricresylic phosphate prepared as above are added to 50 cc. of N/100 of the permanganate solution and the mixture shaken and then permitted to remain quiet. The time should be noted when the purple color of the permanganate disappears and a distinct red is developed. The next color change is from red to brown. Samples containing cresylic acid or phenol change to brown very quickly. My tricresyl phosphate stands the permanganate test for more than about two hours and up to about 3 days and my triphenyl phosphate stands the permanganate test for more than about two hours and up to about twelve hours.

While the specific examples or embodiments of my invention have been given, it is to be expressly understood that I am not limited thereto and that my invention may be used to produce similar products. Also, under some circumstances certain of the steps may be varied or omitted. The temperatures used in the processes, the times of heating and the proportions given in the processes may also be varied within limits without digressing from my invention.

What I claim is:

1. A method which comprises, heating a mixture containing a compound of the phenol series and phosphorus oxychloride fairly rapidly until a temperature of about 90° C. is obtained, and then heating the mixture up to substantially 230° C. at the rate of 5–10° C. per hour.

2. A method of making aryl phosphoric esters, which comprises, heating a mixture containing a phenol and phosphorus oxychloride until condensation is substantially complete, adding an alkaline substance to neutralize acid substances in the mixture, distilling the mixture under reduced pressure, subjecting the distillate to a sulfuric acid treatment, washing the treated distillate, and then drying and decolorizing the distillate.

3. A method which comprises, heating a mixture containing a phenol and phosphorus oxychloride until the reaction is substantially complete, distilling the mixture under a vacuum, washing the resulting product with an alkaline solution and then with water, adding methanol and decolorizing carbon, heating the mixture, filtering and allowing the filtered solution to cool, adding water and then further cooling the liquid to crystallize out an aryl phosphoric ester.

4. A method which comprises, heating a mixture containing a phenol and phosphorus oxychloride until the reaction is substantially complete, distilling under a vacuum, washing the resulting product, adding methanol and decolorizing carbon, filtering, adding water until the solution becomes turbid and then cooling to crystallize out an aryl phosphoric ester.

5. A method of making aryl phosphoric esters, which comprises, heating a mixture of a phenol and phosphorus oxychloride until condensation is substantially complete, distilling the mixture under vacuum, washing the distillate with a caustic solution, washing with water, then washing with a weaker caustic solution, again washing with water, adding methonal to the washed product, adding decolorizing carbon, filtering the solution, adding water to the methanol solution until the solution becomes turbid and then cooling the solution to crystallize the phosphoric ester.

6. A method of making aryl phosphoric esters, which comprises, heating a mixture containing a phenol and phosphorus oxychloride until the reaction is substantially complete, distilling the mixture under a vacuum, adding an inorganic acid and permitting the mixture to stand for a substantial period of time in order to remove organic bases and the like, washing the mixture with water, adding decolorizing carbon, and filtering the mixture to remove solid impurities.

7. A method which comprises, heating a mixture containing a compound of the phenol series and phosphorus oxychloride until the reaction is substantially complete, distilling under a vacuum, adding an inorganic acid to the distillate to remove basic compounds such as pyridine, washing the distillate to remove the acid and soluble impurities, adding decolorizing carbon, and heating the mixture until it is substantially dry, and then filtering the mixture to remove solid impurities.

8. A method of making aryl phosphoric esters, which comprises, heating a mixture containing a phenol and phosphorus oxychloride until condensation is substantially complete, adding lime to neutralize acid substances therein, distilling under vacuum, subjecting the distillate to a sulphuric acid treatment, washing the treated distillate with water to remove the acid and soluble impurities, treating the washed distillate with caustic, again washing with water and then drying and adding decolorizing carbon and decolorizing the distillate.

9. A method of making aryl phosphoric esters, which comprises, heating a mixture containing a phenol and phosphorus oxychloride until condensation is substantially complete, distilling under reduced pressure, mixing concentrated sulphuric acid with the distillate, washing the treated distillate to remove soluble compounds, and drying and adding decolorizing carbon and decolorizing the distillate.

10. A method which comprises, heating a mixture containing a phenol and phosphorus oxychloride until the reaction is substantially complete, distilling under reduced pressure, adding an inorganic acid to the distillate to form soluble compounds from basic compounds such as pyridine, washing the treated distillate with water to remove any remaining acid and soluble impurities, treating the washed distillate with a caustic solution, washing the distillate with water, again treating the distillate with a caustic solution, again washing with water, and drying and decolorizing the distillate.

11. A method which comprises, heating a mixture containing a phenol and phosphorus oxychloride until the reaction is substantially complete, distilling under reduced pressure, adding an inorganic acid to the distillate to form soluble compounds from basic compounds such as pyridine, washing the treated distillate with water to remove any remaining acid and soluble impurities, treating the washed distillate with a caustic solution, washing the distillate with water, drying the distillate and adding decolorizing carbon and decolorizing the distillate.

12. A method which comprises, heating a mixture containing a phenol and phosphorus oxychloride until the reaction is substantially complete, distilling under reduced pressure, adding sulphuric acid to the distillate to render the basic impurities soluble, washing the treated distillate with water to remove any remaining acid and soluble impurities, treating the washed distillate with a caustic solution, washing the distillate with water, drying the distillate and adding decolorizing carbon and decolorizing the distillate.

13. In a method for purifying an aryl phosphoric ester resulting from the interaction of phenol and phosphorus oxychloride, the steps of adding methanol to the ester to dissolve the ester, adding water to the liquid until a turbidity is apparent, and then cooling the liquid mixture to precipitate purified triphenyl phosphate in crystalline form.

14. In a method for purifying an aryl phosphoric ester resulting from the interaction of phenol and phosphorus oxychloride, the steps of adding methanol and decolorizing carbon to the triphenyl phosphate product, filtering, adding water to the filtered liquid until the liquid becomes slightly turbid, and then cooling the precipitate purified triphenyl phosphate in crystalline form.

WINFIELD SCOTT.

CERTIFICATE OF CORRECTION.

Patent No. 1,958,210. May 8, 1934.

WINFIELD SCOTT.

It is hereby certified that error appears in the printed specification of the above numbered patent requiring correction as follows: Page 2, line 12, after "run" insert a period; page 3, line 108, for "process" read processes; page 4, line 49, claim 6, for "wi h" read with; and line 139, claim 14, for "the" read to; and that the said Letters Patent should be read with these corrections therein that the same may conform to the record of the case in the Patent Office.

Signed and sealed this 19th day of June, A. D. 1934.

Bryan M. Battey (Seal) Acting Commissioner of Patents.